US008116630B2

(12) United States Patent
Wisseman

(10) Patent No.: US 8,116,630 B2
(45) Date of Patent: *Feb. 14, 2012

(54) METHODS FOR DYNAMIC WAVELENGTH ADD/DROP IN A ROADM OPTICAL NETWORK

(75) Inventor: Philip Wisseman, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 548 days.

This patent is subject to a terminal disclaimer.

(21) Appl. No.: 12/315,911

(22) Filed: Dec. 8, 2008

(65) Prior Publication Data

US 2010/0142961 A1 Jun. 10, 2010

(51) Int. Cl.
*H04J 14/02* (2006.01)

(52) U.S. Cl. .......................................... 398/83; 398/49

(58) Field of Classification Search ............... 398/83–85, 398/48–50
See application file for complete search history.

(56) References Cited

U.S. PATENT DOCUMENTS

2009/0041457 A1* 2/2009 Maki et al. ...................... 398/45
2009/0232497 A1* 9/2009 Archambault et al. ......... 398/50

* cited by examiner

*Primary Examiner* — Leslie Pascal

(57) ABSTRACT

A system and method for dynamically adding/dropping wavelengths in a reconfigurable optical add-drop multiplexer (ROADM) transport network is disclosed. The system includes at least one optical transponder, a plurality of optical fan-out devices, each arranged to receive an input signal from a network degree and coupled to at least one of a plurality of optical fan-in devices, each optical fan-in device arranged to output a signal to a network degree, the optical fan-out devices comprising at least one wavelength selective switch and the optical fan-in devices comprising at least one wavelength selective switch, the optical fan-out devices and optical fan-in devices being connected so as to enable signals input from each of the plurality of network degrees to be switched to another network degree of the plurality of network degrees; a plurality of demultiplexers for locally dropping selected wavelengths; a plurality of multiplexers for locally adding selected wavelengths; and at least one fiber switch interposed between the at least one optical transponder and the plurality of demultiplexers and multiplexers. The fiber switch is coupled to wavelengths and degrees that are allocated for a bandwidth-on-demand application. Other configurations include additional fan-in and fan-out devices interposed between a mux/demux assembly and the optical transponders to support wavelength redistribution applications.

10 Claims, 10 Drawing Sheets

FROM FIG. 3

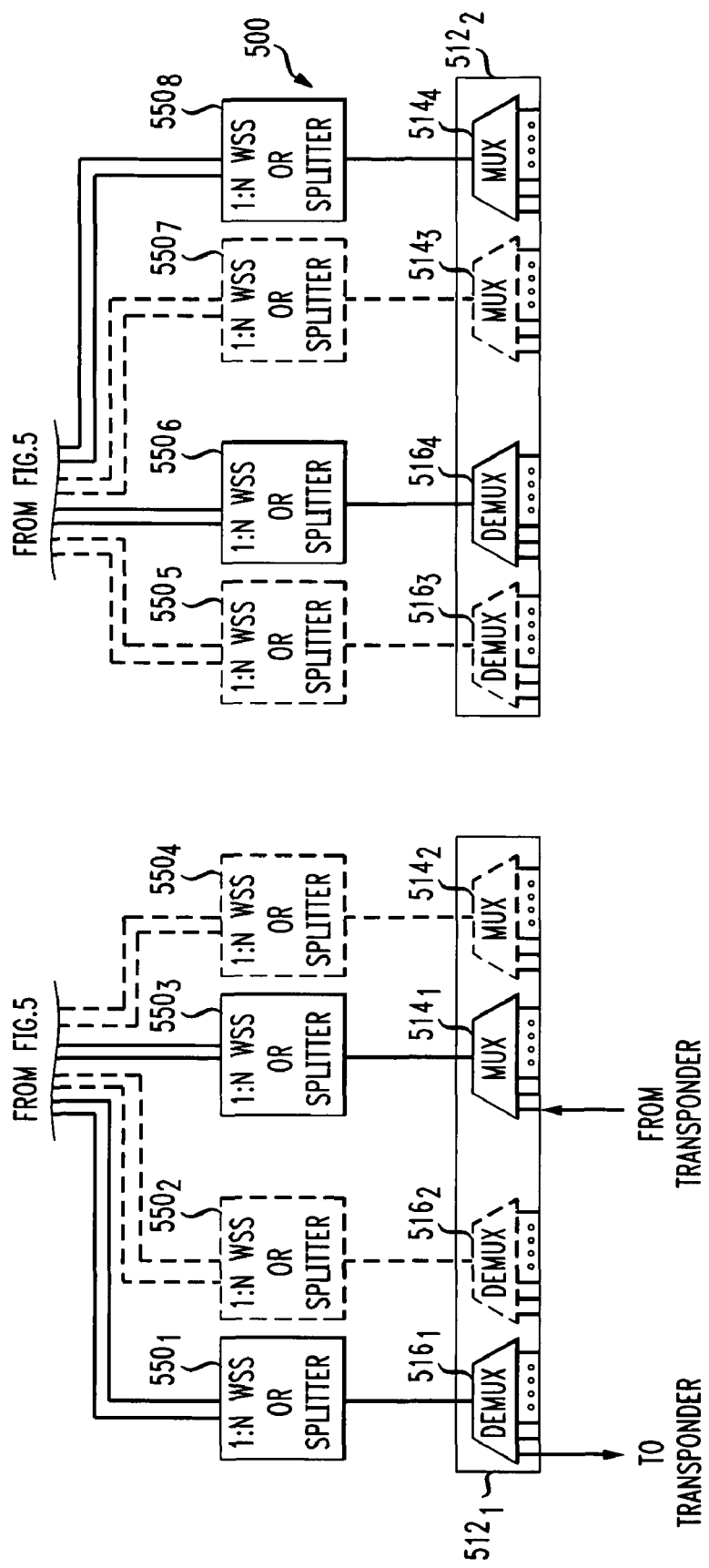

METHODS FOR DYNAMIC WAVELENGTH ADD/DROP IN A ROADM OPTICAL NETWORK

FIELD OF THE INVENTION

The present invention relates generally to optical networks, and more particularly, to a methodology and system for enabling dynamic wavelength add/drop in a reconfigurable add-drop multiplexer (ROADM) optical transport network to support bandwidth-on-demand, mesh restoration and wavelength redistribution applications.

BACKGROUND OF THE INVENTION

In less than a decade, the state of the art in fiber-optic transport systems has progressed from simple point-to-point chains of optically amplified fiber spans to massive networks with hundreds of optically amplified spans connecting transparent add-drop nodes spread over transcontinental distances. Cost reduction has been the primary driver for this transformation, and the primary enabler has been the emergence of the reconfigurable optical add/drop multiplexer (ROADM) as a network element (NE).

Exploiting the inherent wavelength granularity of wavelength-division multiplexing (WDM), an optical add/drop multiplexer (OADM) allows some WDM channels (also referred to as wavelengths) to be dropped at a node, while the others traverse the same node without electronic regeneration. Previously, it was necessary to terminate line systems at each node served, and then regenerate the wavelength signals destined for other nodes. The ability to optically add/drop a fraction of a system's wavelengths at a node was first achieved using fixed OADMs. These were constructed from optical filters, and by enabling wavelengths to optically bypass nodes and eliminate unnecessary regeneration, they provided significant cost savings. However, because traffic growth is inherently unpredictable, it is advantageous for the add-drop capability to be reconfigurable.

ROADMs provide many advantages beyond the savings achieved by optically bypassing nodes. In the future, multi-degree ROADMs with adequate reconfiguration speeds may enable shared-mesh restoration at the optical layer. Shared mesh restoration significantly reduces the number of wavelength channels that must be installed as redundant protection circuits. ROADMs also provide operational advantages. Because ROADMs can be reconfigured remotely, they enable new wavelength channels to be installed by simply placing transponders at the end points, without needing to visit multiple intermediate sites. In addition to these cost-saving benefits, ROADMs will enable new services. For example, if transponders are preinstalled, then new circuits can be provided on-demand. The rapid network reconfiguration provided by ROADMs could also become an enabler of dynamic network services, such as switched video for IPTV. For all of these reasons, ROADMs will continue to have a significant effect on the design of optical networks.

Generally, a ROADM is defined as a NE that permits the active selection of add and drop wavelengths within a WDM signal, while allowing the remaining wavelengths to be passed through transparently to other network nodes. Thus, the simplest ROADM will have two line ports (East and West) that connect to other nodes, and one local port (add/drop) that connects to local transceivers. In today's networks, optical links are typically bidirectional, so each line port represents a pair of fibers. When using conventional local transceivers that can process only a single wavelength at a time, the number of fibers in the add/drop port sets the maximum number of wavelengths that can be added or dropped at a given node.

A ROADM with only two line ports (East and West) is referred to as a two-degree ROADM. Practical networks also have a need for multi-degree ROADMs that can serve more than two line ports. In addition to providing local add/drop of from each of its line ports, the multi-degree ROADM must be able to interconnect any individual wavelength from one line port to another, in a reconfigurable way. The degree of a multi-degree ROADM is equal to the number of line-side fiber pairs that it supports (it does not include the number of fiber pairs used in the add/drop portion of the ROADM).

A full ROADM provides add/drop (de)multiplexing of any arbitrary combination of wavelengths supported by the system with no maximum, minimum, or grouping constraints. A partial ROADM only has access to a subset of the wavelengths, or the choice of the first wavelength introduces constraints on other wavelengths to be dropped. The drop fraction of a ROADM is the maximum number of wavelengths that can be simultaneously dropped, divided by the total number of wavelengths in the WDM signal. If a given add or drop fiber is capable of handling any wavelength, it is said to be colorless. If a given add or drop fiber can be set to address any of the line ports (e.g., east or west for a 2-degree ROADM), it is said to be "steerable." A NE can be configured such that no single failure that will cause a loss of add/drop service to any two of its line ports.

Carriers wish to deploy systems in the most cost-effective manner possible. Today, it is far more cost-effective to initially deploy the minimal amount of equipment that can smoothly evolve to meet future needs, rather than to deploy a fully loaded system configuration from the very beginning. Currently and for the foreseeable future, transponders make up the dominant cost of a fully loaded optical communication system. If a full set of transponders were included in the initial deployment, then a substantial cost would be incurred before the network had sufficient traffic to support the expense. Therefore, systems are routinely designed to permit incremental deployment of transponders on an as-needed basis. Similar considerations also apply to multiplexers, although the economic drivers are not as strong. In general, modular growth will be supported whenever the additional cost and complication of upgrading to higher capacity in the future is small compared to the financial impact of a full equipment deployment at startup. By designing this pay-as-you-grow approach into ROADMs, the network itself can grow in a cost-effective manner. Traditional networks grow by adding and interconnecting stand-alone line systems, incurring substantial cost and complexity. By using ROADMs that allow for modular deployment of additional ports, network growth can benefit from both the equipment and operational efficiencies of integrating line systems as they are needed into a seamless network. Because networks are deployed over the course of years, carriers prefer to be able to grow the nodes of the network from terminals or amplifiers into multi-degree ROADMs. This not only allows the expense to be spread out over years, it also enables the network designers to respond to unforeseen traffic growth patterns.

FIG. 1 is a schematic of a prior art multi-degree ROADM system 100 (four network degrees are shown). Each network degree is coupled to a pair of optical amplifiers 102, with an input connected to a 1×N optical fan-in device, i.e., a power splitter (PS) or wavelength selective switch (WSS) 104), and an output connected to a N×1 optical fan-out device, i.e., WSS 106. Multiplexed optical signals on input $108_1$ from network degree 1 are selectively directed via PS/WSS 104 to WSSs 106 and associated outputs $110_2$, $110_3$ and/or $110_4$ for network degrees 2, 3 and/or 4, respectively. In the same manner, multiplexed optical signals on inputs $108_2$, $108_3$ and $108_4$ (network degrees 2, 3 and 4) may be similarly routed to the other network degrees of the system. A plurality of multiplexer/demultiplexer assemblies $112_1$, $112_2$, $112_3$, and $112_4$ are connected to the WSSs 106 and PS/WSSs 104 for locally adding/dropping wavelengths to/from each network degree 1, 2, 3 and 4 by WSSs 106 and PC/WSSs 104. In this implementation, the add/drop wavelengths cannot be redirected between the network degrees to support dynamic wavelength applications such as bandwidth-on-demand, mesh restoration and wavelength redistribution.

An existing ROADM system for providing dynamic add/drop wavelengths uses a degree for the add/drop wavelengths such that the mux/demux is shared among all the other degrees on the node. Another known approach employs a fiber switch that is disposed between the transponders and the mux/demux to provide a centralized transponder manager such that any transponder can be switched to any add/drop port on any degree. However, none of the previous solutions have proven to be economically practical, and they all suffer from limited scalability.

In view of the above, there exists a need for a new type of multi-degree ROADM system that is specifically adapted for bandwidth-on-demand, mesh restoration or wavelength redistribution applications.

SUMMARY OF THE INVENTION

In accordance with an aspect of the invention, there is provided a system for dynamically adding/dropping wavelengths in a reconfigurable optical add-drop multiplexer (ROADM) transport network. The system includes a plurality of optical fan-out devices, each arranged to receive an input signal from a network degree and coupled to at least one of a plurality of optical fan-in devices, each optical fan-in device arranged to output a signal to a network degree, the optical fan-out devices comprising at least one wavelength selective switch and the optical fan-in devices comprising at least one wavelength selective switch, the optical fan-out devices and optical fan-in devices being connected so as to enable signals input from each of the plurality of network degrees to be switched to another network degree of the plurality of network degrees; a plurality of demultiplexers for locally dropping selected wavelengths; a plurality of multiplexers for locally adding selected wavelengths; and at least one fiber switch interposed between at least one optical transponder and the plurality of demultiplexers and multiplexers, the fiber switch being coupled to wavelengths and degrees that are allocated for a bandwidth-on-demand application.

The multiplexers and demultiplexers have fixed-wavelength ports, and the at least one transponder is tunable to any wavelength supported by the ROADM.

In one embodiment, the fiber switch is an M×N fiber switch adapted for coupling with M transponders and N wavelengths or degrees through the multiplexers and demultiplexers.

In another embodiment, first and second fiber switches are interposed between a plurality of optical transponders and the multiplexers and demultiplexers to provide at least one redundant path through the ROADM. In this expedient, at least one optical transponder includes a protection port, and the transponder is coupled to the first fiber switch and the second fiber switch.

In yet another embodiment, a pair of optical transponders is respectively connected to the first fiber switch and the second fiber switch, and a Y-splitter couples the pair of optical transponders.

In still another embodiment, first and second 1×N fiber switches are employed, with the first fiber switch coupled to the plurality of multiplexers and the second fiber switch coupled to the plurality of demultiplexers. Each multiplexer and demultiplexer comprises a wavelength selective switch, and the first and second fiber switches are further coupled to at least one optical transponder.

In accordance with another aspect of the invention, there is provided a system for dynamically adding/dropping wavelengths in a reconfigurable optical add-drop multiplexer (ROADM) transport network. The system comprises a plurality of optical fan-out devices, each arranged to receive an input signal from a network degree and coupled to at least one of a plurality of optical fan-in devices, each optical fan-in device arranged to output a signal to a network degree, the optical fan-out devices comprising at least one wavelength selective switch and the optical fan-in devices comprising at least one wavelength selective switch, the optical fan-out devices and optical fan-in devices being connected so as to enable signals input from each of the plurality of network degrees to be switched to another network degree of the plurality of network degrees; a plurality of demultiplexers for locally dropping selected wavelengths; a plurality of multiplexers for locally adding selected wavelengths; an optical fan-in device coupling each demultiplexer to an optical fan-out device for dropping a wavelength from a network degree; and an optical fan-out device coupling each multiplexer to an optical fan-in device for adding a wavelength to a network degree.

In accordance with yet another aspect of the invention, there is provided a method for dynamically adding/dropping wavelengths in a reconfigurable optical add-drop multiplexer (ROADM) transport network, comprising: a plurality of optical fan-out devices, each arranged to receive an input signal from a network degree and coupled to at least one of a plurality of optical fan-in devices, each optical fan-in device arranged to output a signal to a network degree, the optical fan-out devices comprising at least one wavelength selective switch and the optical fan-in devices comprising at least one wavelength selective switch, the optical fan-out devices and optical fan-in devices being connected so as to enable signals input from each of the plurality of network degrees to be switched to another network degree of the plurality of network degrees; a plurality of demultiplexers for locally dropping selected wavelengths; a plurality of multiplexers for locally adding selected wavelengths. The method comprises the steps of: adding an optical fan-in device and a demultiplexer and coupling the demultiplexer to an optical fan-out device for receiving a dropped wavelength from a network degree for a bandwidth-on-demand application; and adding an optical fan-out device and a multiplexer and coupling the multiplexer to an optical fan-in device for adding a wavelength to a network degree for a bandwidth-on-demand application.

These aspects of the invention and further advantages thereof will become apparent to those skilled in the art as the present invention is described with particular reference to the accompanying drawings.

DETAILED DESCRIPTION OF THE INVENTION

Embodiments of the invention will be described with reference to the accompanying drawing figures wherein like numbers represent like elements throughout to the extent possible. Before embodiments of the invention are explained in detail, it is to be understood that the invention is not limited in its application to the details of the examples set forth in the following description or illustrated in the figures. The invention is capable of other embodiments and of being practiced or carried out in a variety of applications and in various ways. Also, it is to be understood that the phraseology and terminology used herein is for the purpose of description and should not be regarded as limiting. The use of "including," "comprising," or "having" and variations thereof herein are meant to encompass the items listed thereafter and equivalents thereof as well as additional items.

Figure 1:
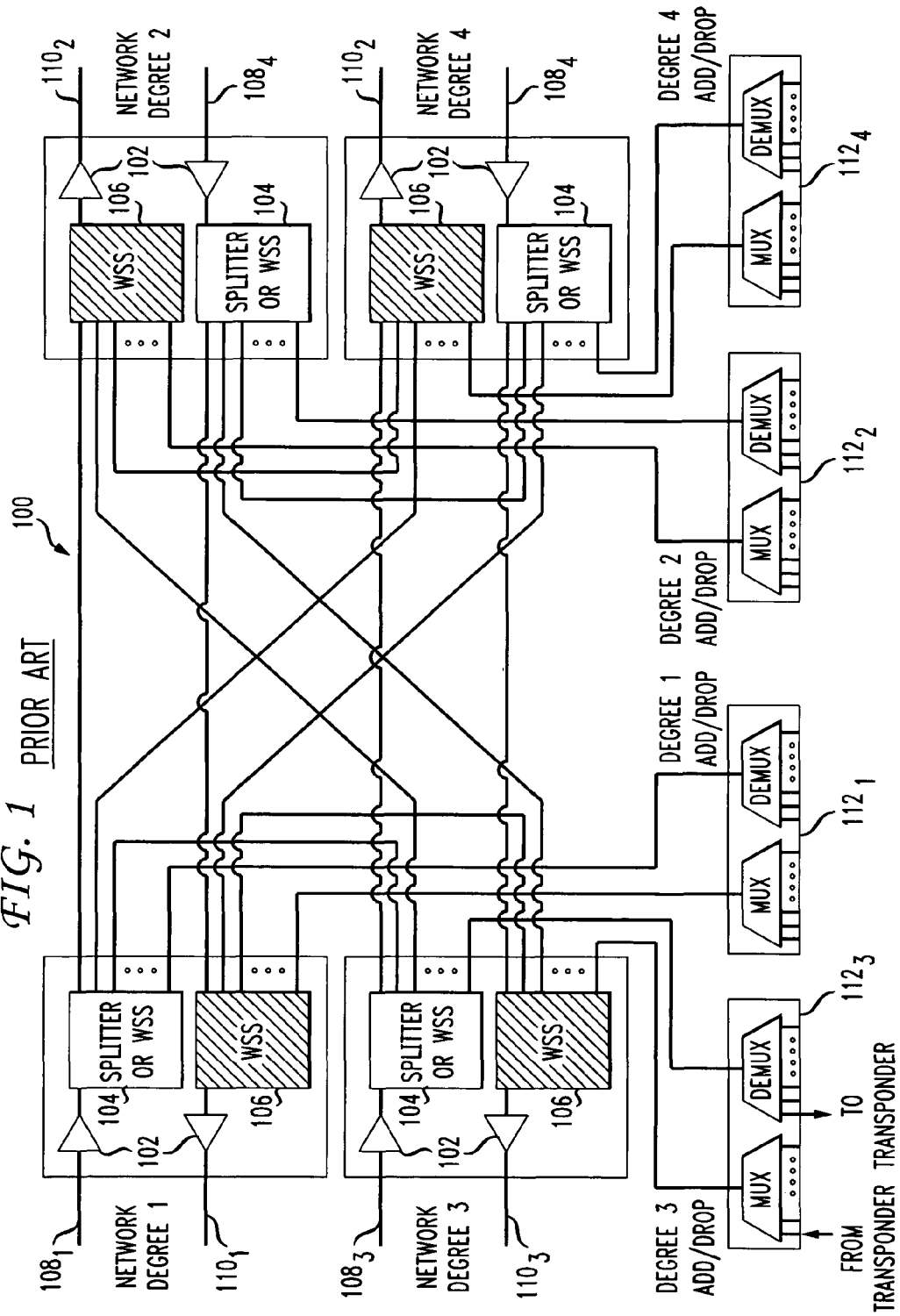
FIG. 1 is a schematic of a prior art system for adding and dropping wavelengths in a multi-degree ROADM transport network.
Figure 2:
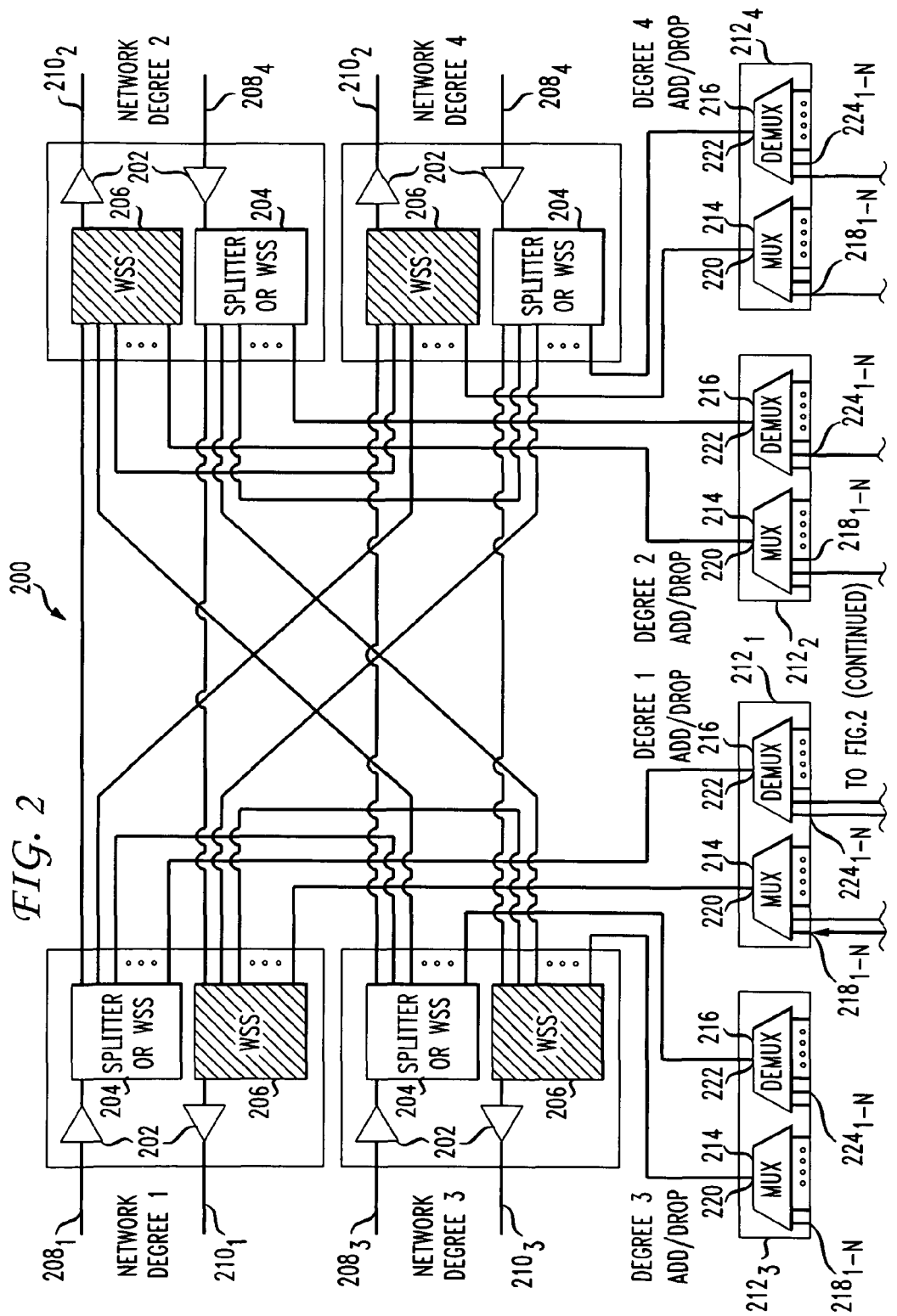
FIG. 2 is a schematic of an exemplary system for dynamically adding/dropping wavelengths in a ROADM transport network utilizing a M×N fiber switch in accordance with an aspect of the invention.
Figure 2:
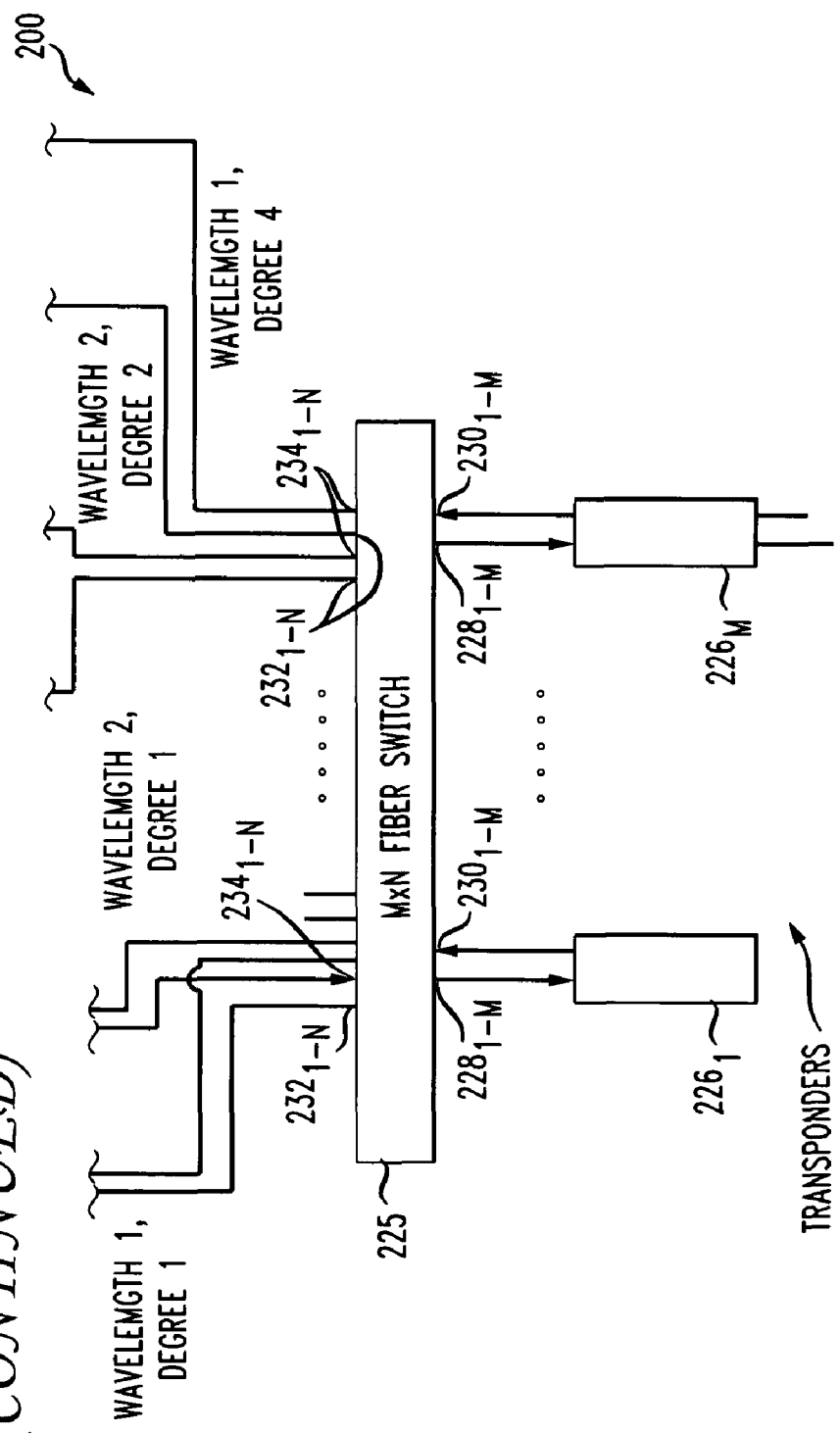

FIG. 2 is a schematic of an exemplary multi-degree ROADM system 200 in accordance with an aspect of the present invention. Four network degrees are depicted in the figure, with each degree having an input $208_1$, $208_2$, $208_3$, and $208_4$, respectively coupled to an amplifier 202 and a 1×N PS or WSS 204. Similarly, each degree has an output $210_1$, $210_2$, $210_3$ and $210_4$, respectively, coupled to an amplifier 202 and an N×1 WSS 206. As described above, multiplexed optical signals on any of the inputs $208_{1-4}$ may be switched to any of the outputs $210_{1-4}$ by the PSs/WSSs 204 and WSSs 206 serving each network degree. A multiplexer (mux)/demultiplexer (demux) assembly $212_1$, $212_2$, $212_3$ and $212_4$ is respectively connected to each network degree 1-4 to facilitate local add/drop of wavelengths. Each mux/demux $212_{1-4}$ includes a mux 214 and demux 216. The mux 214 comprises a plurality of input ports $218_1$, $218_2$, . . . $218_N$, and an output port 220. The demux 216 comprises an input port 222 and a plurality of output ports $224_1$, $224_2$, . . . $224_N$. For each network degree, the output port 220 of each mux 214 is connected to one of the N input ports of a respective WSS 206. Similarly, the input port 222 of each demux 216 is connected to one of the N output ports of a respective PS/WSS 204. An M×N fiber switch 225 is disposed between a plurality of optical transponders 226 and the mux/demux assemblies $212_{1-4}$. In accordance with the invention, the fiber switch 225 is constructed and arranged with connections to those wavelengths and degrees that are predetermined to be used for a bandwidth-on-demand (BWOD) application. In the example shown in FIG. 2, wavelengths 1 and 2 are added/dropped to/from network degree 1, wavelength 2 added/dropped to/from network degree 2, and wavelength 1 added/dropped to/from network degree 4. In this regard, each mux/demux $212_{1-4}$ are arrayed waveguide gratings or the like provided with fixed-wavelength ports. The M×N fiber switch 225 can serve M transponders and access/switch up to N wavelengths or degrees between the M transponders and the mux/demux assemblies $212_{1-4}$. As will be appreciated by those skilled in the art, each transponder 226 may be tuned to transmit and receive any wavelength supported by the ROADM system. Wavelengths added at the ROADM are transmitted from each transponder $226_{1-M}$ to one of ports $228_{1-M}$ of fiber switch 225. Similarly, wavelengths dropped at the ROADM are communicated from ports $230_{1-M}$ of fiber switch 225 to the transponders tuned to receive those wavelengths. On the mux/demux side, the added wavelengths are communicated from ports $232_{1-N}$ of fiber switch 225 to the mux/demux, and dropped wavelengths from the selected network degrees are input to the fiber switch 225 at ports $234_{1-N}$.

Figure 3:
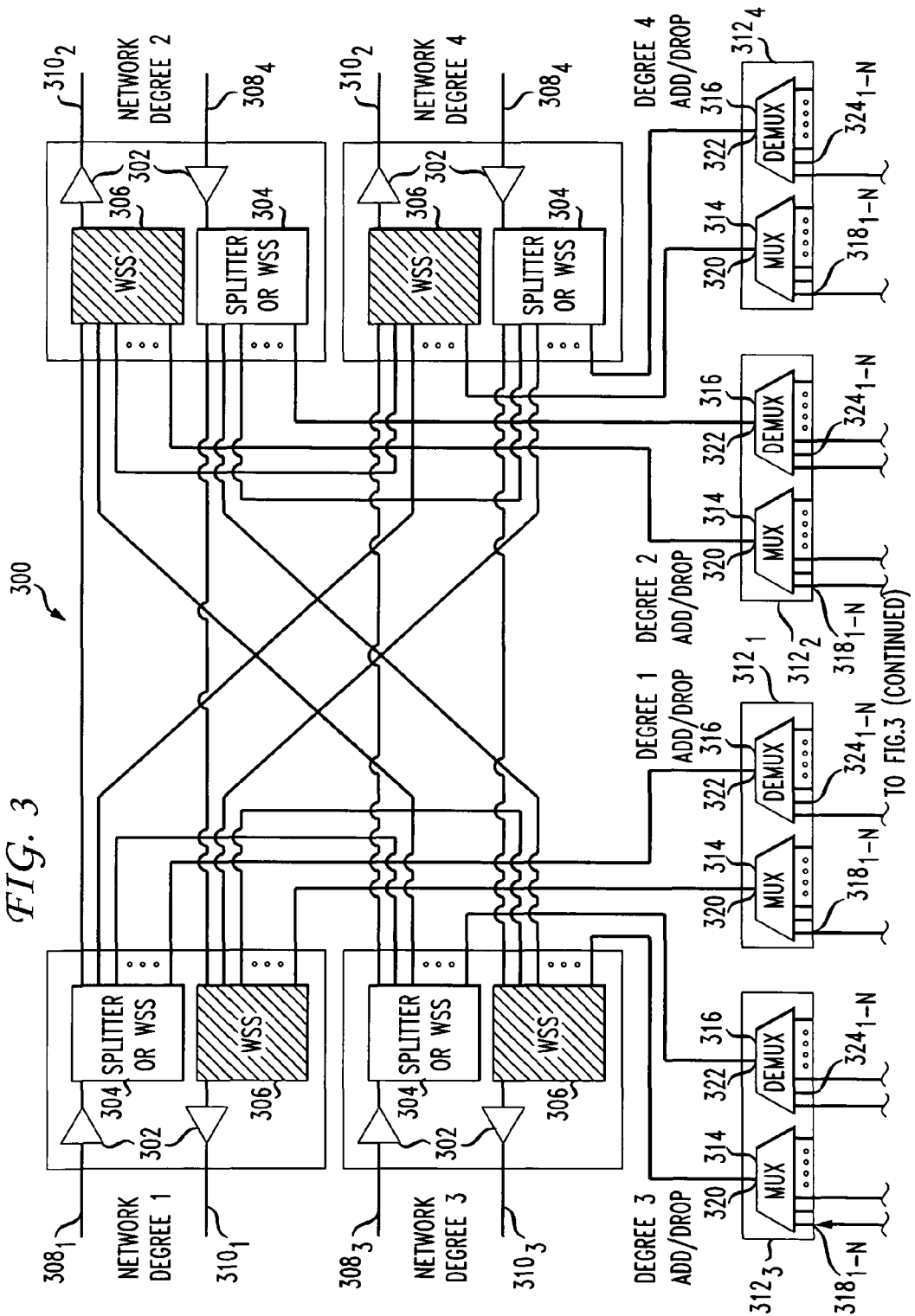
FIG. 3 is a schematic of an exemplary system for dynamically adding/dropping wavelengths in a ROADM transport network utilizing a pair of M×N fiber switches in accordance with another aspect of the invention.
Figure 3:
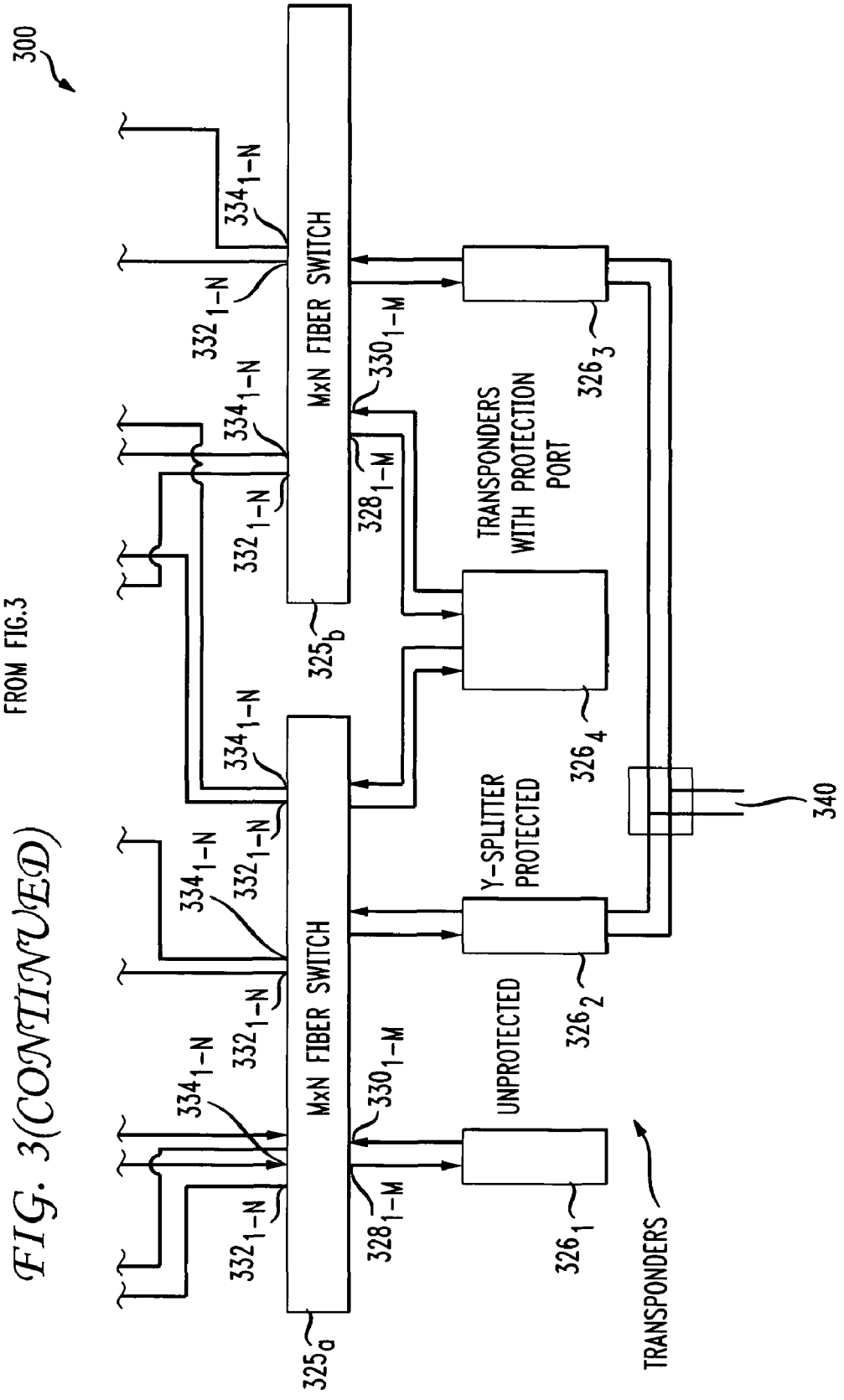

FIG. 3 is a schematic of an exemplary ROADM system 300 in accordance with another aspect of the invention. Four network degrees are depicted in the figure, with each degree having an input $308_1$, $308_2$, $308_3$, and $308_4$, respectively coupled to an amplifier 302 and a 1×N PS or WSS 304. Similarly, each degree has an output $310_1$, $310_2$, $310_3$ and $310_4$, respectively, coupled to an amplifier 302 and an N×1 WSS 306. A mux/demux assembly $312_1$, $312_2$, $312_3$ and $312_4$ is respectively connected to each network degree 1-4 to facilitate local add/drop of wavelengths. Each mux/demux $312_{1-4}$ includes a mux 314 and demux 316. The mux 314 comprises a plurality of input ports $318_1$, $318_2$, . . . $318_N$, and an output port 320. The demux 316 comprises an input port 322 and a plurality of output ports $324_1$, $324_2$, . . . $324_N$. For each network degree, the output port 320 of each mux 314 is connected to one of the N input ports of a respective WSS 306. Similarly, the input port 322 of each demux 316 is connected to one of the N output ports of a respective PS/WSS 304. In this embodiment, a pair of M×N fiber switches 325a, 325b, is employed in lieu of the single fiber switch 225 in the embodiment of FIG. 2. This arrangement eliminates the potential for a single point of failure in the ROADM 300. Each fiber switch 325a, 325b has a plurality of M output ports 328 and input ports 330 on the transponder side, and a plurality of N input ports 334 and output ports 332 on the mux/demux side. The exemplary system of FIG. 3 includes an unprotected transponder $326_1$, and three protected transponders $326_2$, $326_3$ and $326_4$. Transponders $326_2$, $326_3$ are coupled to a Y-splitter 340. Transponder $326_4$ includes conventional and protection ports for servicing the same wavelengths through both fiber switches 325a and 325b. For unprotected wavelengths, either switch 325a, 325b may be employed to access any wavelength/degree in the ROADM system 300. As shown, network degree 2 has an add/drop path through both switches 325a, 325b for wavelengths 3 and 1 respectively.

Figure 4:
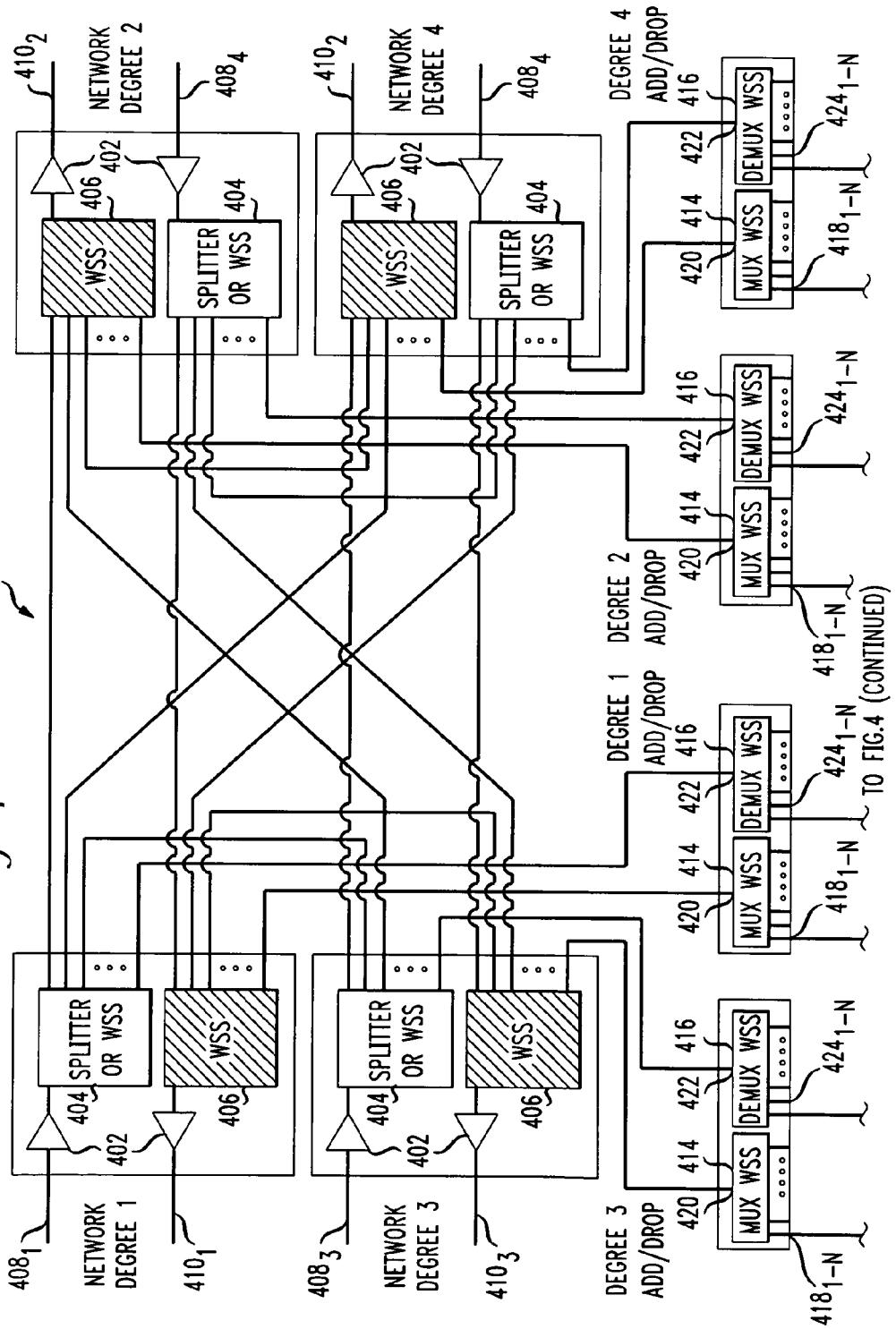
FIG. 4 is a schematic of an exemplary system for dynamically adding/dropping wavelengths in a ROADM transport network employing a pair of 1×N fiber switches for each transponder, and multiplexers/demultiplexers comprising wavelength selective switches in accordance with yet another aspect of the invention.
Figure 4:
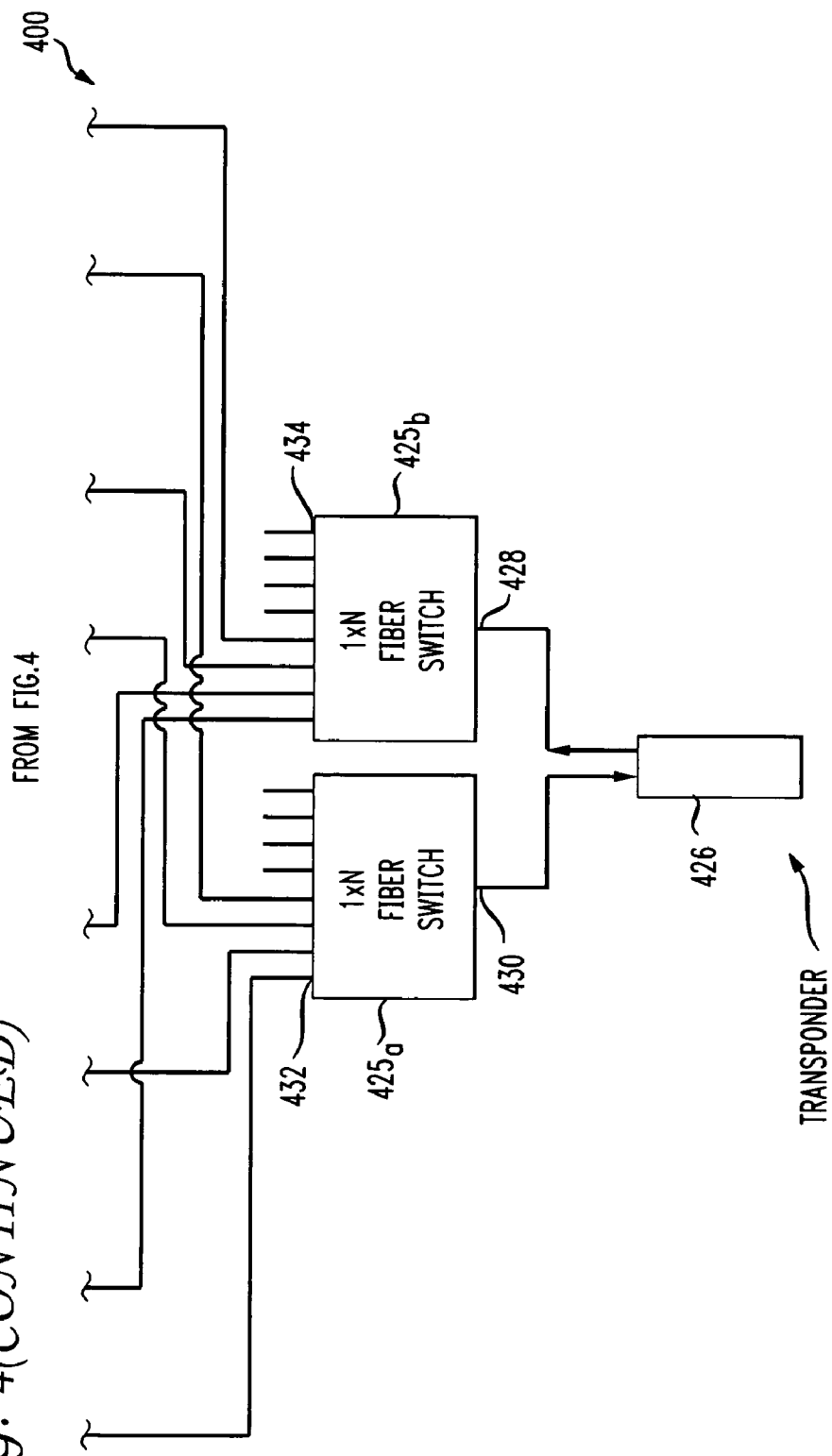

FIG. 4 is schematic of an exemplary ROADM 400 in accordance with another aspect of the invention. Four network degrees are depicted in the figure, with each degree having an input $408_1$, $408_2$, $408_3$, and $408_4$, respectively coupled to an amplifier 402 and a 1×N PS or WSS 404. Similarly, each degree has an output $410_1$, $410_2$, $410_3$ and $410_4$, respectively, coupled to an amplifier 402 and an N×1 WSS 406. A mux/demux assembly $412_1$, $412_2$, $412_3$ and $412_4$ is respectively connected to each network degree 1-4 to facilitate local add/drop of wavelengths. Each mux/demux $412_{1-4}$ includes a mux 414 and demux 416. The mux 414 comprises a plurality of input ports $418_1$, $418_2$, . . . $418_N$, and an output port 420. The demux 416 comprises an input port 422 and a plurality of output ports $424_1, 424_2, \ldots 424_N$. For each network degree, the output port 420 of each mux 414 is connected to one of the N input ports of a respective WSS 406. Similarly, the input port 422 of each demux 416 is connected to one of the N output ports of a respective PS/WSS 404. In this expedient, a first 1×N fiber switch 425a has a single input port 430 connected to the transmit port of a transponder 426, and a plurality of N output ports 432 that may be coupled to the mux/demux assembly. Similarly, a second 1×N fiber switch 425b has a plurality of input ports 434 that may be coupled to the mux/demux assembly and a single output port 428 that connects to the receive port of transponder 428. As shown, fiber switch 425a is connected to mux 414 for adding wavelength 1 to network degrees 1-4, and fiber switch 425b is connected to demux 416 for dropping wavelength 1 from network degrees 1-4. In this arrangement, the ports can accept any of the wavelengths supported by the ROADM system, and are thus referred to as "colorless." A separate 1×N switch is utilized for the transmit direction (add) and the receive direction (drop) for each transponder 426 that requires dynamic add/drop wavelength capability. Since the add/drop ports are colorless, each transponder can access any wavelength up to N degrees. This configuration may be used either for applications with predetermined wavelengths and routes, or for applications with real-time selection of any wavelength and route.

Another proposed application for the dynamic add/drop of optical wavelengths is the redistribution wavelengths to support a migration from a ring-based network topology to a mesh topology. In this application, when capacity is exhausted in a network consisting of interconnected rings, an express route can be added between large nodes that bypasses smaller intermediate nodes on the original ring. In order to free capacity to these smaller nodes, the express wavelengths must then be redistributed to the new route. This application requires a shared mux/demux configuration to allow the add/drop wavelengths to be moved to the new route. This application requires that the capability to share the mux/demux be reserved for use by the future overlay route(s). However, since it is necessary to insure that the redistribution of the wavelengths doesn't collapse diversely-routed wavelengths onto the same shared risk link group (SRLG), the degrees that will ultimately share the mux/demux can be limited based on the SRLG. In addition, the deployment of this shared mux/demux capability can be limited to degrees at locations with large local add/drop demand for express wavelengths.

Figure 5:
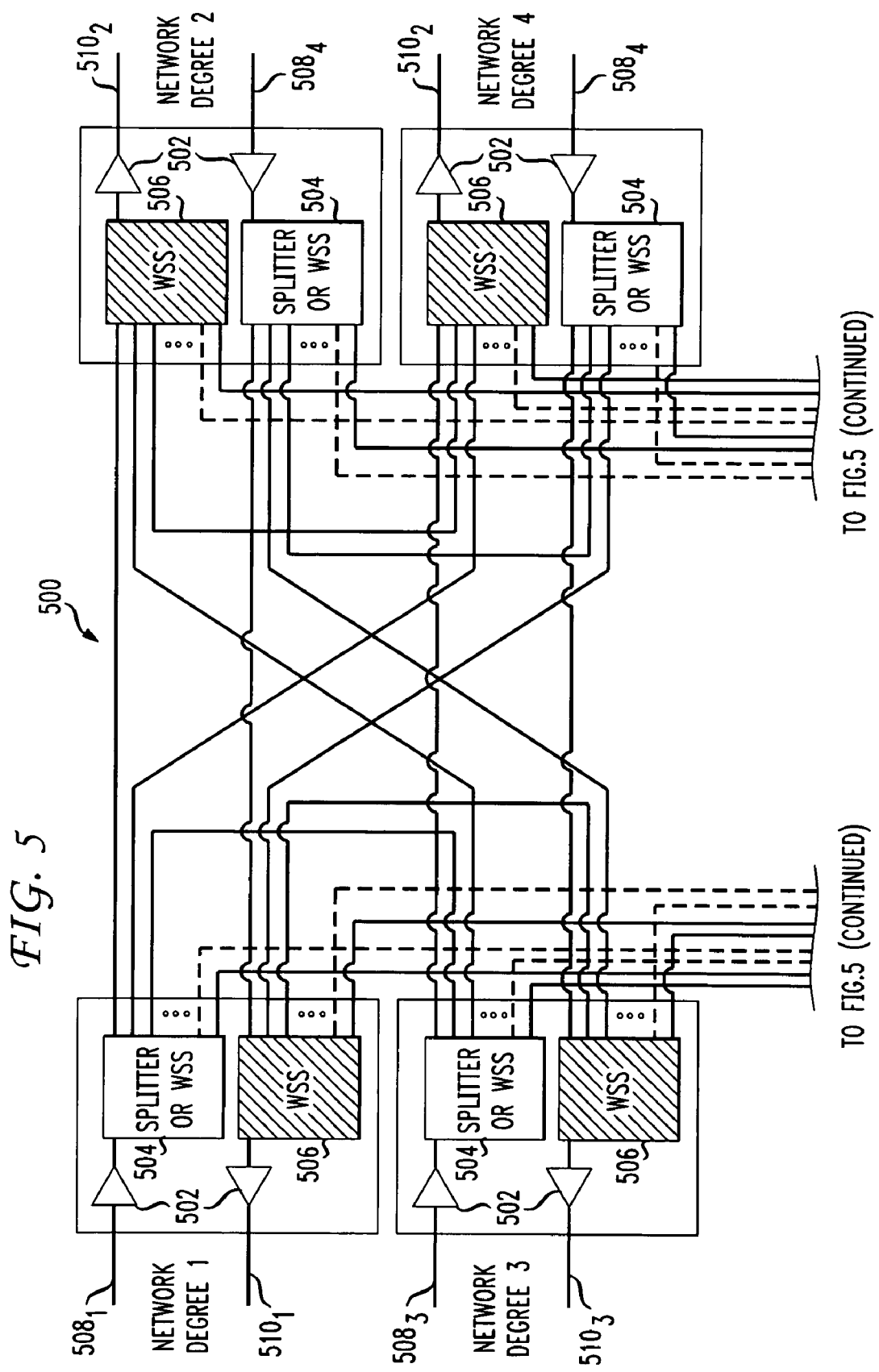
FIG. 5 is a schematic of an exemplary system for supporting a wavelength redistribution application in accordance with an aspect of the invention.

FIG. 5 is a schematic of an exemplary ROADM system 500 in accordance with another aspect of the invention for supporting a wavelength redistribution application. Four network degrees are depicted, each having a respective input $508_1$, $508_2$, $508_3$, and $508_4$, coupled to an amplifier 502 and a PS/WSS 504, and a respective output $510_1$, $510_2$, $510_3$ and $510_4$, coupled to an amplifier 502 and a WSS 506. In this embodiment, a mux/demux $512_1$ is shared between network degrees 1 and 3, and a mux/demux $512_2$ is shared between network degrees 2 and 4. Mux/demux $512_1$ comprises muxs $514_1, 514_2$, and demuxs $516_1, 516_2$, and mux/demux $512_2$ comprises muxs $514_3, 514_4$ and demuxs $516_3, 516_4$. Demux $516_1$ is connected to network degrees 1 and 3 via N×1 WSS/PS $550_1$ and demux $516_2$ is connected to network degrees 1 and 3 via WSS/PS $550_2$. If a passive PS 504 is used instead of a WSS 504, then a WSS (in lieu of a PS) must be used for $550_1, 550_2$. Muxs $514_1$ and $514_2$ are coupled to network degrees 1 and 3 via 1×N WSSs/PSs $550_3$ and $550_4$ that are in turn connected to WSSs 506. Similar to mux/demux $512_1$, demuxs $516_3, 516_4$ are adapted to drop wavelengths from network degrees 2 and 4 via N×1 WSS/PS $550_5, 550_6$, and muxs $514_3, 514_4$ can add wavelengths to network degrees 2 and 4 through 1×N WSS/PS $550_7, 550_8$. In this manner, selected wavelengths can be added and dropped as required to create an express route between large network nodes that bypass smaller intermediate nodes on the original ring. This permits freeing capacity to the smaller nodes by redistributing the wavelengths on the new route. In the example shown in FIG. 5, the dashed lines depict the routing of redistributed wavelengths to and from network degrees 1-4 by the ROADM system 500.

Figure 6:
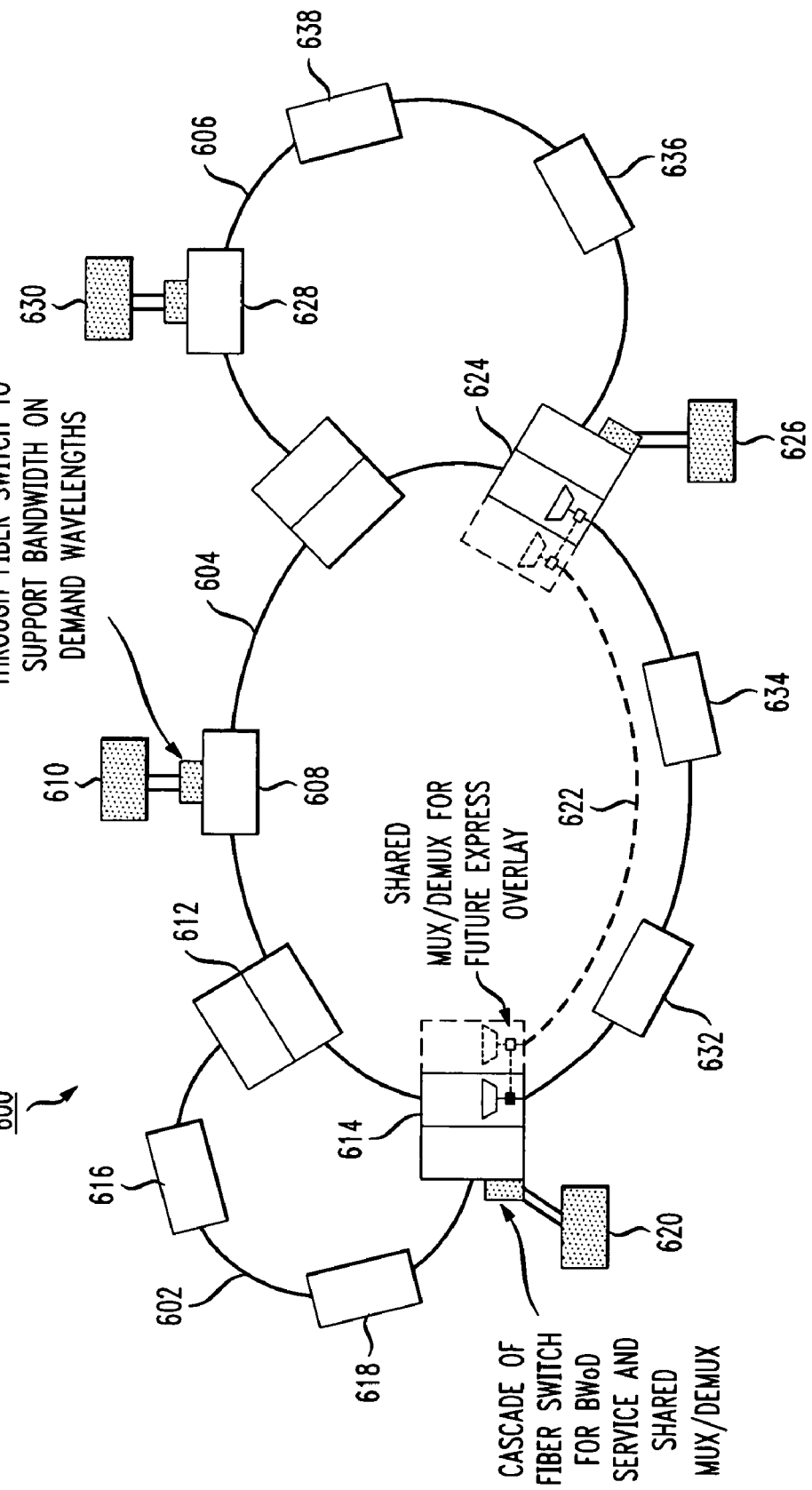
FIG. 6 is a schematic of an illustrative deployment of a plurality of wavelength add/drop applications in an ROADM optical transport network in accordance with aspects of the invention.

FIG. 6 is a schematic depicting an exemplary cascade of the foregoing embodiments in a fiber optic network 600 comprising a first ring 602, a second ring 604 and a third ring 606. Ring 604 includes a ROADM 608 serving a BWoD application 610 through a fiber switch arrangement as described above. Ring 602 is coupled to ring 604 by ROADMs 612 and 614. Ring 602 further includes ROADMs 616 and 618. ROADM 614 also includes a fiber switch for service to BWoD application 620, and a shared mux/demux for enabling a future express overlay 622 as described above in the embodiment of FIG. 5. ROADM 624 is similarly configured and enables service to BWoD application 626 through a fiber switch, and the express overlay 622. ROADM 624 also connects ring 604 to ring 606. A ROADM 628 on ring 606 supports BWoD service to BWoD application 630 through a fiber switch analogously to ROADM 608 on ring 604. Ring 604 further includes ROADMs 632 and 634, which may be similarly configured to provide additional BWoD service as required. Ring 606 also includes additional ROADMs 636 and 638 that may operate using the same principles. Cascading these solutions provides support for all of the dynamic add/drop applications while only requiring that the equipment for each application be placed when and where needed.

The above-described expedients provide an economic and scalable solution for supporting dynamic add/drop applications without the need for ubiquitous deployment of dynamic add/drop equipment for all wavelengths in a WDM optical system. This methodology enables new dynamic wavelength services to be deployed and supports migration to a mesh network topology with more efficient utilization of wavelength capacity.

The foregoing detailed description is to be understood as being in every respect illustrative and exemplary, but not restrictive, and the scope of the invention disclosed herein is not to be determined from the description of the invention, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention.

I claim:

1. A system for dynamically add/dropping wavelengths in a reconfigurable optical add-drop multiplexer transport network having a plurality of optical transponders, comprising:
   a plurality of optical fan-out devices, each arranged to receive an input signal from a network degree and coupled to a plurality of optical fan-in devices, each optical fan-in device arranged to output a signal to a network degree, the optical fan-out devices comprising a wavelength selective switch and the optical fan-in devices comprising a wavelength selective switch, the optical fan-out devices and optical fan-in devices being connected so as to enable signals input from each of a plurality of network degrees to be switched to another network degree of the plurality of network degrees;
a plurality of demultiplexers for locally dropping selected wavelengths;
a plurality of multiplexers for locally adding selected wavelengths;
a fiber switch interposed between the plurality of optical transponders and the plurality of demultiplexers and the plurality of multiplexers, the fiber switch being coupled to wavelengths and degrees that are allocated for a bandwidth-on-demand application, wherein the fiber switch comprises first and second fiber switches interposed between the plurality of optical transponders and the plurality of multiplexers and the plurality of demultiplexers to provide a redundant path through the reconfigurable optical add-drop multiplexer;
a pair of optical transponders of the plurality of optical transponders respectively coupled to the first fiber switch and the second fiber switch; and
a Y-splitter coupled to the pair of optical transponders.

2. The system of claim 1, wherein the plurality of multiplexers and the plurality of demultiplexers have fixed-wavelength ports, and the plurality of optical transponders are tunable to any wavelength supported by the reconfigurable optical add-drop multiplexer.

3. The system of claim 1, wherein the fiber switch is a M×N fiber switch adapted for coupling with M transponders and N wavelengths or degrees through the multiplexers and demultiplexers.

4. The system of claim 1, further comprising an optical transponder having a protection port, the optical transponder with the protection port being coupled to the first fiber switch and the second fiber switch.

5. A system for dynamically adding/dropping wavelengths in a reconfigurable optical add-drop multiplexer transport network having a plurality of optical transponders, comprising:
a plurality of optical fan-out devices, each arranged to receive an input signal from a network degree and coupled to a plurality of optical fan-in devices, each optical fan-in device arranged to output a signal to a network degree, the optical fan-out devices comprising a wavelength selective switch and the optical fan-in devices comprising a wavelength selective switch, the optical fan-out devices and optical fan-in devices being connected so as to enable signals input from each of a plurality of network degrees to be switched to another network degree of the plurality of network degrees;
a plurality of demultiplexers for locally dropping selected wavelengths;
a plurality of multiplexers for locally adding selected wavelengths;
an optical fan-in device coupling each demultiplexer to an optical fan-out device for dropping a wavelength from a network degree;
an optical fan-out device coupling each multiplexer to an optical fan-in device for adding a wavelength to a network degree;
a fiber switch interposed between the plurality of optical transponders and the plurality of demultiplexers and the plurality of multiplexers, the fiber switch being coupled to wavelengths and degrees that are allocated for a bandwidth-on-demand application, wherein the fiber switch comprises first and second fiber switches interposed between the plurality of optical transponders and the plurality of multiplexers and the plurality of demultiplexers to provide a redundant path through the reconfigurable optical add-drop multiplexer;
a pair of optical transponders of the plurality of optical transponders respectively coupled to the first fiber switch and the second fiber switch; and
a Y-splitter coupled to the pair of optical transponders.

6. A method for dynamically adding/dropping wavelengths in a reconfigurable optical add-drop multiplexer transport network comprising: a plurality of optical fan-out devices, each arranged to receive an input signal from a network degree and coupled to a plurality of optical fan-in devices, each optical fan-in device arranged to output a signal to a network degree, the optical fan-out devices comprising a wavelength selective switch, the optical fan-out devices and optical fan-in devices being connected so as to enable signals input from each of a plurality of network degrees to be switched to another network degree of the plurality of network degrees; a plurality of demultiplexers for locally dropping selected wavelengths; and a plurality of multiplexers for locally adding selected wavelengths, the method comprising:
connecting a fiber switch between the plurality of optical transponders and the plurality of demultiplexers and the plurality of multiplexers, the fiber switch being coupled to wavelengths and degrees that are allocated for a bandwidth-on-demand application; wherein the fiber switch comprises first and second fiber switches interposed between the plurality of optical transponders and the plurality of multiplexers and the plurality of demultiplexers to provide a redundant path through the reconfigurable optical add-drop multiplexer, a pair of the plurality of optical transponders respectively coupled to the first fiber switch and the second fiber switch, and a Y-splitter coupling the pair of optical transponders.

7. The method of claim 6, wherein the fiber switch is a M×N fiber switch adapted for coupling with M transponders and N wavelengths or degrees through the multiplexers and demultiplexers.

8. A method for dynamically adding/dropping wavelengths in a reconfigurable optical add-drop multiplexer transport network, comprising: a plurality of optical fan-out devices, each arranged to receive an input signal from a network degree and coupled to a plurality of optical fan-in devices, each optical fan-in device arranged to output a signal to a network degree, the optical fan-out devices comprising a wavelength selective switch and the optical fan-in devices comprising a at least one wavelength selective switch, the optical fan-out devices and optical fan-in devices being connected so as to enable signals input from each of a plurality of network degrees to be switched to another network degree of the plurality of network degrees; a plurality of demultiplexers for locally dropping selected wavelengths; a plurality of multiplexers for locally adding selected wavelengths;
the method comprising:
adding an optical fan-in device and a demultiplexer and coupling the demultiplexer to an optical fan-out device for receiving a dropped wavelength from a network degree for a bandwidth-on-demand application;
adding an optical fan-out device and a multiplexer and coupling the multiplexer to an optical fan-in device for adding a wavelength to a network degree for a bandwidth-on-demand application; and
connecting a fiber switch between the plurality of optical transponders and the plurality of demultiplexers and the plurality of multiplexers, the fiber switch being coupled to wavelengths and degrees that are allocated for a bandwidth-on-demand application; wherein the fiber switch comprises first and second fiber switches interposed between the plurality of optical transponders and the plurality of multiplexers and the plurality of demultiplexers to provide a redundant path through the reconfigurable optical add-drop multiplexer, a pair of the plurality of optical transponders respectively coupled to the first fiber switch and the second fiber switch, and a Y-splitter coupling the pair of optical transponders.

9. The method of claim 8, wherein the optical fan-in devices are wavelength switches.

10. The method of claim 8, wherein the optical fan-out devices are wavelength selective switches.

* * * * *

UNITED STATES PATENT AND TRADEMARK OFFICE
CERTIFICATE OF CORRECTION

| | | |
|---|---|---|
| PATENT NO. | : 8,116,630 B2 | Page 1 of 1 |
| APPLICATION NO. | : 12/315911 | |
| DATED | : February 14, 2012 | |
| INVENTOR(S) | : Philip Wisseman | |

It is certified that error appears in the above-identified patent and that said Letters Patent is hereby corrected as shown below:

Col. 10, in Claim 8, line 46, "...comprising a at least one wavelength selective switch..." should read -- ...comprising a wavelength selective switch... --

Signed and Sealed this
Twenty-ninth Day of May, 2012

David J. Kappos
*Director of the United States Patent and Trademark Office*